(12) United States Patent
Nagata et al.

(10) Patent No.: US 10,060,527 B2
(45) Date of Patent: Aug. 28, 2018

(54) RANGE-SWITCHING CONTROL DEVICE

(71) Applicant: DENSO CORPORATION, Kariya, Aichi-pref. (JP)

(72) Inventors: Hiromitsu Nagata, Kariya (JP); Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/525,638

(22) PCT Filed: Feb. 16, 2016

(86) PCT No.: PCT/JP2016/000799
§ 371 (c)(1),
(2) Date: May 10, 2017

(87) PCT Pub. No.: WO2016/139904
PCT Pub. Date: Sep. 9, 2016

(65) Prior Publication Data
US 2017/0335960 A1    Nov. 23, 2017

(30) Foreign Application Priority Data

Mar. 5, 2015 (JP) ................. 2015-043224

(51) Int. Cl.
*F16H 61/28* (2006.01)
*F16H 61/32* (2006.01)
*F16H 59/08* (2006.01)
(52) U.S. Cl.
CPC ......... *F16H 61/2807* (2013.01); *F16H 59/08* (2013.01); *F16H 61/32* (2013.01); *F16H 2061/326* (2013.01)

(58) Field of Classification Search
CPC ...... F16H 61/2807; F16H 61/32; F16H 59/08; F16H 2061/326
See application file for complete search history.

(56) References Cited

U.S. PATENT DOCUMENTS

| 2004/0008002 | A1  | 1/2004 | Kamio et al. |
| 2005/0156550 | A1* | 7/2005 | Kamio .................... F16H 61/32 318/445 |
| 2006/0108966 | A1  | 5/2006 | Kamio et al. |
| 2013/0024079 | A1* | 1/2013 | Sekiya .................... F16H 61/32 701/51 |

FOREIGN PATENT DOCUMENTS

| JP | H06-66367   | 3/1994 |
| JP | 2006-194420 | 7/2006 |

* cited by examiner

*Primary Examiner* — David J Hlavka
(74) *Attorney, Agent, or Firm* — Nixon & Vanderhye P.C.

(57) ABSTRACT

During changing of a shift range (for example, from P-range to NotP-range), an SBW-ECU determines whether it is in a range-change delay condition (a switching completion time of the shift range is delayed than a normal switching completion time). When it is determined that it is in the range-change delay condition, it is determined whether a target range should be changed to a safer range (for example, P-range). As a result, when it is determined that the target range should be changed to the safer range, the target range is changed to the safer range. Thereby, even if a driver determines that the shift range cannot be changed before the switching completion of the shift range and the driver gets off the vehicle, the shift range can be changed to the safer range (P-range).

6 Claims, 6 Drawing Sheets

RANGE-SWITCHING CONTROL DEVICE

CROSS REFERENCE TO RELATED APPLICATION

This application is the U.S. national phase of International Application No. PCT/JP2016/000799 filed on Feb. 16, 2016 which designated the U.S. and claims priority to Japanese Patent Application No. 2015-43224 filed on Mar. 5, 2015, the entire contents of which are hereby incorporated by reference.

TECHNICAL FIELD

The present disclosure relates to a range-switching control device which switches a shift range by means of a motor as a driving source.

BACKGROUND ART

In recent years, also in a vehicle, a mechanical driving system tends to be replaced with an electrically driving system in order to satisfy requirements of a space-saving, an improvement of ease of assembly, an improvement of controllability and the like. For example, as shown in Patent Literature 1, a range-switching mechanism of an automatic transmission for a vehicle is driven by a motor. The range-switching mechanism is provided with an encoder which outputs a pulse signal at a specified angle in synchronization with a rotation of the motor. A feedback control is performed in such a manner that an energization phase of the motor 12 is sequentially changed according to a counting value of an output signal of the encoder and the motor is driven to a target rotational position (target counting value) corresponding to a target range, whereby a shift range is changed to a target shift range.

Moreover, in Patent Literature 1, when a failure of a feedback control system of the motor is detected, an open loop control is performed in such a manner that the energization phase of the motor 12 is sequentially changed and the motor is driven to the target rotational position, whereby the shift range is changed to the target shift range.

However, in such a case, it is likely that a switching completion time of the shift range may be delayed than a normal switching completion time (that is, a time period until a switching completion may become longer than a normal time period). In case that the switching completion time of the shift range is delayed than the normal switching completion time, it is likely that a driver may determine (misunderstand) that the shift range cannot be changed before the switching completion of the shift range and the driver may get off a vehicle. It is necessary to secure safety in preparation for such a situation.

PRIOR ART LITERATURES

Patent Literature

Patent Literature 1: JP 2004-56855 A

SUMMARY OF INVENTION

It is an object of the present disclosure to provide a range-switching control device which can secure a safety in case a switching completion time of a shift range will be delayed than a normal switching completion time.

According to an aspect of the present disclosure, a range-switching control device is provided with a range-switching mechanism switching a shift range by means of a motor as a driving source, an encoder outputting a pulse signal in synchronization with a rotation of the motor, and a range-switching control portion switching the shift range to a target range by driving the motor to a target rotational position corresponding to the target range, based on a counting value of the pulse signal of the encoder. Further, the range-switching control device is provided with a delay-determination portion determining whether a switching completion time of the shift range will be delayed than a normal switching completion time, a change-determination portion determining whether the target range should be changed to a safer range when the delay-determination portion determines that the switching completion time of the shift range will be delayed than the normal switching completion time, and a target-range-change portion changing the target range to the safer range when the change-determination portion determines that the target range should be changed to the safer range.

With the above configuration, during changing the shift range, it is determined whether the switching completion time of the shift range will be delayed than the normal switching completion time (that is, the time period until a switching completion will become longer than the normal time period). Thus, when the switching completion time of the shift range is delayed than the normal switching completion time due to some causes, the delay of the switching completion time can be detected.

When it is determined that the switching completion time of the shift range will be delayed than the normal switching completion time, it is determined whether the target range should be changed to a safer range. With this configuration, in a situation where the switching completion time of the shift range is delayed than the normal switching completion time, it can be determined whether the target range should be changed to a safer range to secure safety or the safety can be ensured without changing the target range.

As a result, when it is determined that the target range should be changed to a safer range, the target range is changed to a safer range. Thus, the shift range can be switched to the safer range, and the safety can be secured in a situation where the switching completion time of the shift range is delayed than the normal switching completion time.

Besides, the safer range represents a position of the shift range in which a driving force from an engine is not transmitted to driving wheels of a vehicle, and the vehicle is stopped.

BRIEF DESCRIPTION OF THE DRAWINGS

The above and other objects, features and advantages of the present disclosure will become more apparent from the following detailed description made with reference to the accompanying drawings. In the drawings.

The above and other objects, features and advantages of the present disclosure will become more apparent from the following detailed description made with reference to the accompanying drawings.

DETAILED DESCRIPTION

Embodiments will be described hereinafter.

First Embodiment

Referring to FIGS. 1 to 4, a first embodiment will be described hereinafter.

Figure 1:
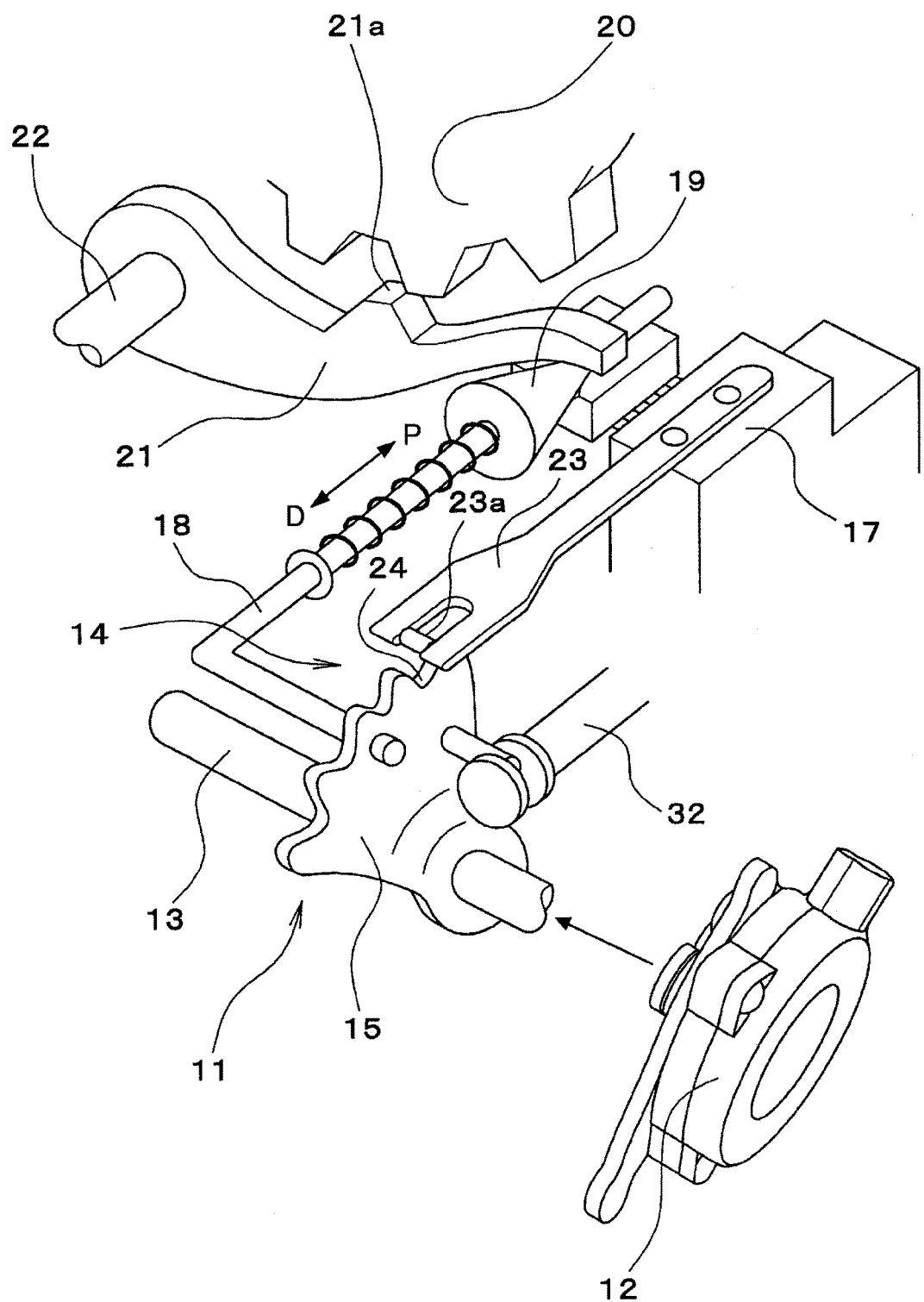
FIG. 1 is a perspective view showing a range-switching mechanism according a first embodiment of the present disclosure.
Figure 2:
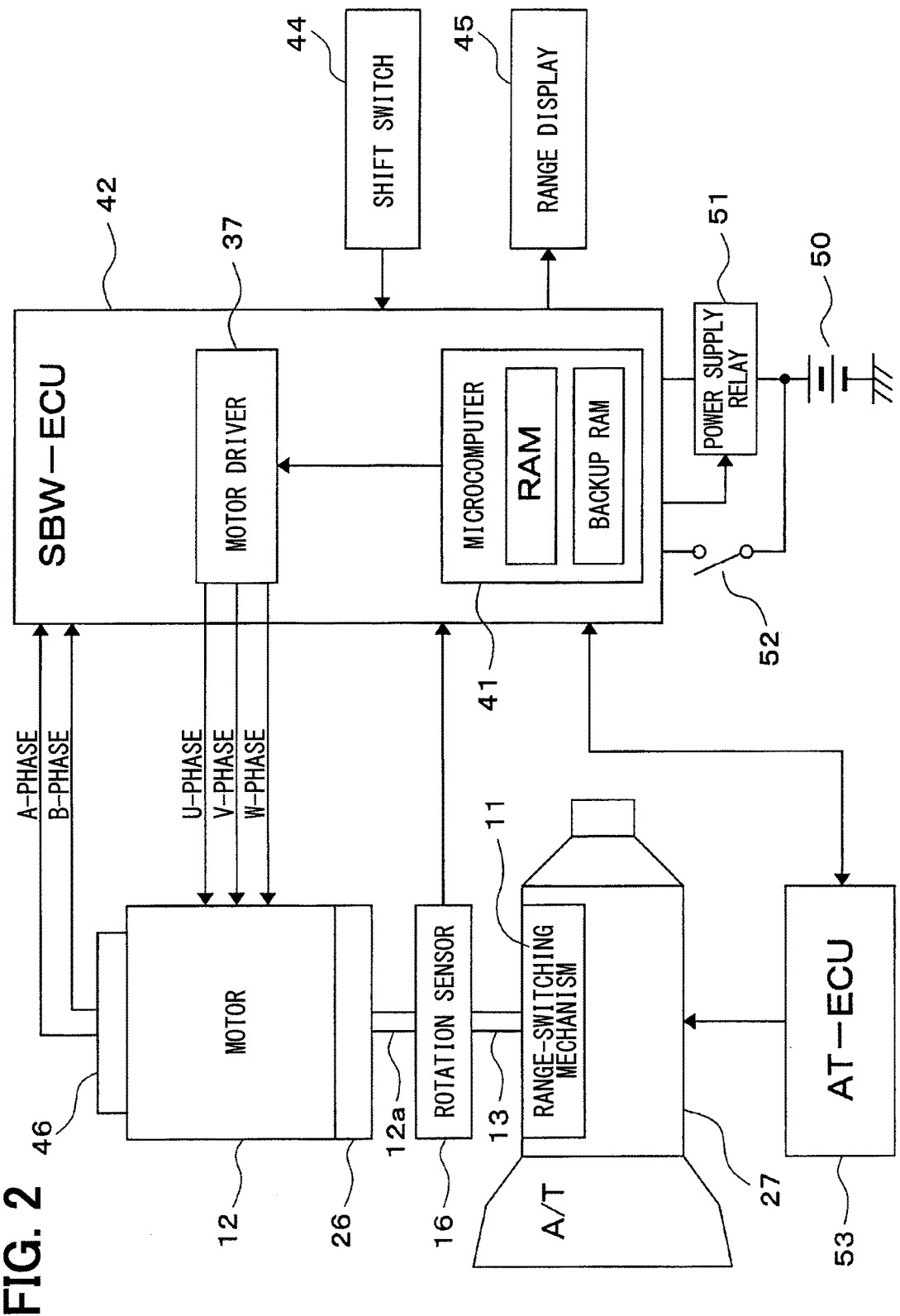
FIG. 2 is a chart showing a schematic structure of a range-switching control system.

First, referring to FIGS. 1 and 2, a configuration of a range-switching control system is explained.

As shown FIG. 1, the range-switching mechanism 11 is a four-position range-switching mechanism which changes a shift range of an automatic transmission 27 (refer to FIG. 2) between P-range (parking range), R-range (reverse range), N-range (neutral range), and D-range (driving range). A motor 12 driving the range-switching mechanism 11 is a switched reluctance motor, for example. The motor 12 has a reduction mechanism 26 (refer to FIG. 2), and a manual shaft 13 of the range-switching mechanism 11 is connected to an output axis 12a (refer to FIG. 2) of the motor 12. A detent lever 15 is fixed to the manual shaft 13.

The manual valve 32 performing a linear motion according to rotation of the detent lever 15 is connected to the detent lever 15. The shift range is changed by switching a hydraulic circuit (not shown) in the automatic transmission 27 by means of the manual valve 32.

Moreover, an L-shaped parking rod 18 is fixed to the detent lever 15, and a conical body 19 arranged at an end portion of the parking rod 18 is in contact with a locking lever 21. The locking lever 21 moves upwardly and downwardly around an axis 22 according to a position of the conical body 19, so that a parking gear 20 is locked or unlocked. The parking gear 20 is connected to the output shaft of the automatic transmission 27. When the parking gear 20 is locked by the locking lever 21, driving wheels of a vehicle are held at a locking state (parking state).

A detent spring 23 for holding the detent lever 15 in each range of P, R, N, and D is fixed on a supporting base 17. The detent lever 15 has range holding recess 24 for each of P-range, R-range, N-range, and D-range. When an engaging portion 23a arranged at a tip end of the detent spring 23 is engaged with one of the range holding recess 24, the detent lever 15 is held at a position corresponding to each range. The detent lever 15, the detent spring 23, etc. configure a detent mechanism 14 (detent) which holds a rotational position of the detent lever 15 at each of ranges (that is, the range-switching mechanism 11 is held at a position corresponding to each of ranges).

In P-range, the parking rod 18 moves toward the locking lever 21, and a large diameter portion of the conical body 19 pushes up the locking lever 21 so that a projection 21a of the locking lever 21 is engaged with the parking gear 20 to lock the parking gear 20. Thereby, the output axis (driving wheels) of the automatic transmission 27 is held at a locked state (parking state).

Meanwhile, in ranges other than P-range, the parking rod 18 moves away from the locking lever 21, the large diameter portion of the conical body 19 escapes from the locking lever 21, and the locking lever 21 moves downwardly. The projection 21a of the locking lever 21 is disengaged from the parking gear 20 to unlock the parking gear 20, so that the output axis of the automatic transmission 27 is held rotatable (a vehicle can travel).

As shown in FIG. 2, the manual shaft 13 of the range-switching mechanism 11 is provided with a rotation sensor 16 detecting a rotational angle (rotational position) of the manual shaft 13. The rotation sensor 16 is a sensor (for example, potentiometer) which outputs voltage according to the rotational angle of the manual shaft 13. Based on the output voltage of the rotation sensor 16, a current shift range can be identified between P-range, R-range, N-range, and D-range.

As shown in FIG. 2, the motor 12 is provided with an encoder 46 detecting a rotational angle (rotational position) of a rotor. The encoder 46 is a magnetic-type rotary encoder, for example, which outputs pulse signals of A-phase and B-phase at specified rotational angle in synchronization with the rotational angle of the rotor of the motor 12. An SBW-ECU 42 (range-switching control portion) has a microcomputer 41. The microcomputer 41 counts both of rising edge and falling edge of the A-phase signal and the B-phase signal outputted from the encoder 46. According to the counting value (encoder counting value), a motor driver 37 switches an energization phase of the motor 12 in a specified order to drive the motor 12. Besides, it may be configured that two combinations of windings of the three-phase (U-phase, V-phase, W-phase) of the motor 12 and the motor driver 37 are established. Even if one system has a malfunction, the motor 12 can be driven by the other system.

During rotating the motor 12, the rotation direction of the motor 12 is determined according to an occurrence order of the A-phase signal and the B-phase signal. When the motor 12 rotates in a positive direction (P-range→D-range), the encoder counting values is counted up. When the motor 12 rotates in a reverse direction (D-range→P-range), the encoder counting values is counted down. A corresponding relation between the encoder counting value and the rotational angle of the motor 12 is maintained even if the motor 12 rotates in any one of the positive direction and the reverse direction. Thus, the rotational position of the motor 12 is detected based on the encoder counting value, and the winding corresponding to the rotational position is energized to drive the motor 12.

A signal indicative of a shift-lever operative position detected by a shift switch 44 is inputted into the SBW-ECU 42. A microcomputer 41 of the SBW-ECU 42 switches a target range (target shift range) according to a driver's shift-lever operation, switches the shift range by driving the motor 12 according to the target range, and indicates the actual shift range on a range display 45 of an instrument panel (not shown).

A power supply voltage is supplied to the SBW-ECU 42 through a power supply relay 51 from a battery 50 (power source) mounted on a vehicle. The power supply relay 51 is turned ON/OFF by manually turning an IG switch (ignition switch) ON/OFF. When the IG switch 52 is turned ON, the power supply relay 51 is turned ON so that the power supply voltage is supplied to the SBW-ECU 42. When the IG switch 52 is turned OFF, the power supply relay 51 is turned OFF so that the power supply voltage is not supplied to the SBW-ECU 42.

The SBW-ECU 42 controlling a range switch operation of the automatic transmission 27, an AT-ECU 53 (another control portion) controlling a shift operation of the automatic transmission 27, and the other ECU (for example, an engine ECU) are communicated with each other through communication lines (for example, LAN line in vehicle etc.), so that required information is mutually transmitted therebetween through a CAN communication and the like.

When the target range is switched by a driver's shift-lever operation, the microcomputer 41 of the SBW-ECU 42 changes the rotational position (target count value) of the motor 12 according to the target range. Then, the microcomputer 41 performs a feedback control in which the energization phase of the motor 12 is sequentially changed according to the encoder counting value and the motor 12 is driven to the target rotational position corresponding to the target range, so that the shift range is switched to the target range (the switching position of the range-switching mechanism 11 is switched to the position of a target range).

Incidentally, it is likely that a switching completion time of the shift range may be delayed than a normal switching completion time due to some causes (that is, a time period until a switching completion may become longer than a normal time period). In case that the switching completion time of the shift range is delayed than the normal switching completion time, it is likely that a driver may determine (misunderstand) that the shift range cannot be changed before a switching completion of the shift range, and the driver may get off a vehicle. Thus, it is necessary to secure safety in preparation for such a situation.

Figure 3:
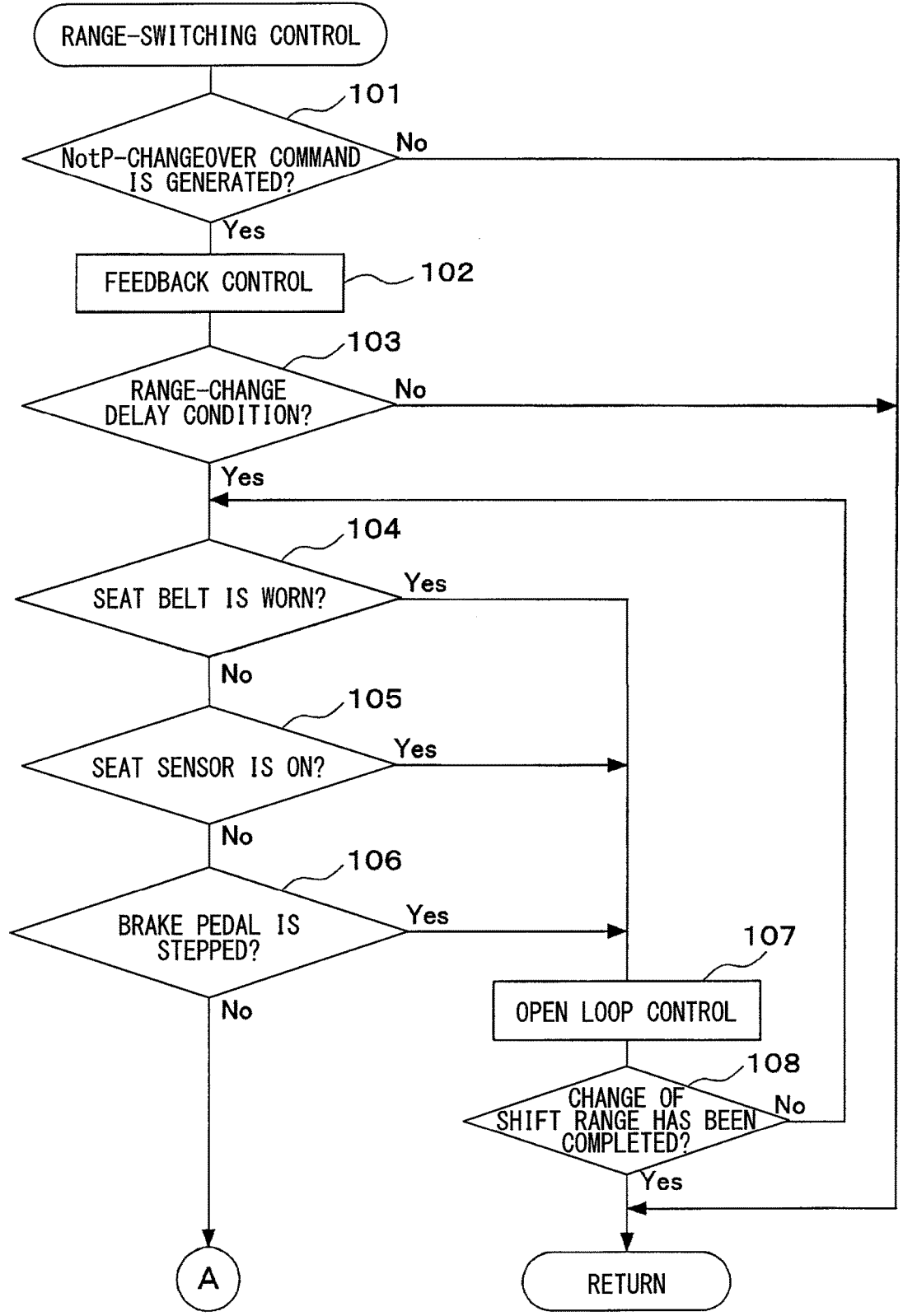
FIG. 3 is a flowchart showing a first half of processing of a range-switching control routine according to the first embodiment.
Figure 4:
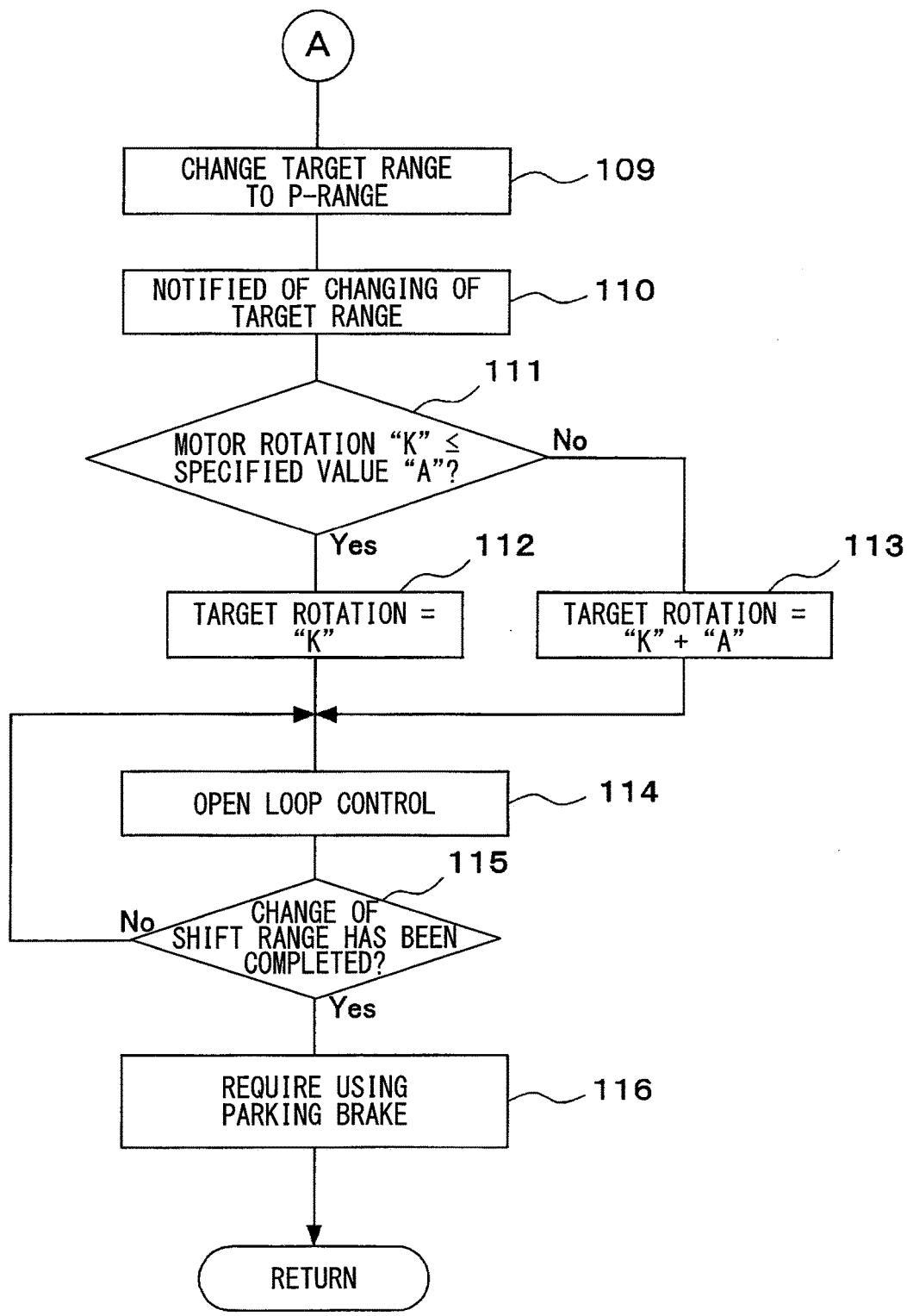
FIG. 4 is a flowchart showing a last half of processing of a range-switching control routine according to the first embodiment and a second embodiment.

According to the first embodiment, the SBW-ECU 42 performs a range-switching control routine shown in FIGS. 3 and 4.

For example, when the target range is switched from P-range to NotP-range (ranges other than P-range), a feedback control is performed in such a manner that the energization phase of the motor 12 is sequentially changed according to the encoder counting value and the motor 12 is driven to the target rotational position corresponding to the target range (NotP-range).

During changing the shift range, it is determined whether the switching completion time of the shift range will be delayed than the normal switching completion time (that is, the time period until a switching completion will become longer than the normal time period) based on whether the encoder 46 has a malfunction, for example. Thus, when the switching completion time of the shift range is delayed than the normal switching completion time, the delay of the switching completion time can be detected.

When it is determined that the switching completion time of the shift range is delayed than the normal switching completion time, it is determined whether the target range should be changed to a safer range (for example, P-range) based on a driver's alighting condition. With this configuration, in a situation where the switching completion time of the shift range is delayed than the normal switching completion time, it can be determined whether the target range should be changed to a safer range to secure safety or the safety can be ensured without changing the target range.

As a result, when it is determined that the target range should be changed to a safer range, the target range is changed to a safer range. Thereby, the shift range can be switched to a safer range (P-range).

Meanwhile, when it is determined that the target range should not be changed into a safer range, it is determined that the safety can be ensured without changing the target range. Thereby, a shift range can be switched to the target range (NotP-range) as an initial requirement.

Besides, the safer range represents a position of the shift range in which a driving force from an engine is not transmitted to driving wheels of a vehicle, and the vehicle is stopped. In the present embodiment, since the range-switching mechanism has four positions, P-range (parking range) and N-range (neutral range) correspond to the safer ranges.

Referring to FIGS. 2 and 3, the range-switching control routine which the SBW-ECU 42 performs will be described hereinafter. In the first embodiment, the SBW-ECU 42 functions as a delay-determination portion, a change-determination portion, and a target-range-change portion by performing the range-switching control routine shown in FIGS. 3 and 4.

The range-switching control routine shown in FIGS. 3 and 4 is executed at a specified interval while the SBW-ECU 42 is ON. In step 101, it is determined whether a NotP-changeover command is generated based on whether the target range is changed to NotP-range (any one of R-range, N-range, and D-range).

When it is determined that the NotP-changeover command is not generated in step 101, the routine is finished without performing the subsequent steps.

Meanwhile, when it is determined that the NotP-changeover command is generated in step 101, the procedure proceeds to step 102 in which the feedback control is performed in such a manner that the energization phase of the motor 12 is sequentially changed according to the encoder counting value and the motor 12 is driven to the target rotational position corresponding to the target range (NotP-range).

Then, the procedure proceeds to step 103 in which it is determined whether the switching completion time of the shift range is delayed than the normal switching completion time (range-change delay condition) based on whether the encoder 46 has a malfunction.

In a case that the encoder 46 has a malfunction, since the feedback control cannot be normally performed based on the encoder counting, it is likely that the switching completion time of the shift range is delayed than the normal switching completion time. Therefore, by monitoring the encoder 46, it can be determined whether it is in the range-change delay condition (the switching completion time of the shift range is delayed than the normal switching completion time).

Specifically, it is determined whether the encoder 46 has a malfunction based on whether the encoder counting value has been uncounted (unchanged for a specified time period or more). As a result, when the encoder 46 has a malfunction, it is determined that it is in the range-change delay condition. Meanwhile, when the encoder 46 has no malfunction, it is determined that it is not in the range-change delay condition.

When it is determined that it is not in the range-change delay condition in step 103, the routine is finished without performing step 104 and the subsequent steps.

When it is determined that it is in the range-change delay condition in step 103, it is determined whether the target range should be changed to the safer range (for example, P-range) based on a driver's alighting condition in following steps 104 to 106.

In case that the switching completion time of the shift range is delayed than the normal switching completion time, it is likely that a driver may determine (misunderstand) that the shift range cannot be changed before the switching completion of the shift range and the driver may get off a vehicle. If the driver gets off the vehicle, it is better to change the target range into the safer range so as to secure the safety. Thus, it can be determined whether the target range should be changed into the safer range by monitoring the driver's alighting condition.

Specifically, it is determined whether a seat belt of a driver's seat is worn (for example, a seat belt switch is ON or OFF) in step 104.

In step 105, it is determined whether a seat sensor of the driver's seat is ON.

In step 106, it is determined whether a brake pedal is stepped (for example, a brake switch is ON or OFF).

When the answer is "Yes" in any one of the above-mentioned steps 104 to 106, it is determined that the driver does not get off the vehicle (the driver sits on a seat) and the target range should not be changed into the safer range. Meanwhile, when the answers are "No" in all of the above-mentioned steps 104 to 106, it is determined that the driver has gotten off the vehicle and the target range should be changed into the safer range.

In the above-mentioned steps 104 to 106, when it is determined that the target range should not be changed into the safer side, it is determined that the safety can be ensured without changing the target range. In this case, the procedure proceeds to step 107 in which the current range (NotP-range) is maintained without changing the target range and an open loop control is performed so that the energization phase of the motor 12 is sequentially changed and the motor 12 is driven to the target rotational position.

Then, the procedure proceeds to step 108 in which it is determined whether the change of the shift range has been completed (the motor 12 has rotated to the target rotation position) or not. In a case that the encoder 46 has a malfunction, it is determined whether the motor 12 has rotated to the target rotation position based on the output signals of the rotation sensor 16 or a number of switching of the energization phase of the motor 12. When it is determined that the change of the shift range has not been completed in step 108, the procedure goes back to step 104. Then, when it is determined that the change of the shift range has been completed in step 108, the routine is terminated.

Meanwhile, when it is determined that the target range should be changed to the safer range in steps 104 to 106, it is determined that the target range should be changed to the safer range and the procedure proceeds to step 109 in FIG. 4 so that the target range is changed to the safer range (P-range). By changing the target range to the safer range, the rotation direction of the motor 12 is changed to a counter direction.

Then, the procedure proceeds to step 110 in which a driver is notified of changing of the target range to the safer range (P-range). In such a case, for example, a warning lamp (not shown) arranged on an instrument panel of the driver's seat is turned ON or blinked. Alternatively, an alarm is displayed on an alarm display portion (not shown) of the instrument panel of the driver's seat, and a warning beep or a vocal sound informs the driver of the change of the target range.

Then, the procedure proceeds to step 111 in which it is determined whether a rotation "K" of the motor 12 after starting of the shift range change (rotation of the motor 12 after starting the feedback control) is less than or equal to a specified value "A". The specified value "A" is established as the value equivalent to a play (backlash) of a rotation transmission system of the motor 12.

When it is determined that the rotation "K" of the motor 12 is less than or equal to the specified value "A" in step 111, it is determined that the rotation "K" of the motor 12 is within the play of the rotation transmission system of the motor 12. The procedure proceeds to step 112 in which a target rotation up to the changed target range (P-range) is set to the same value as the rotation "K" of the motor 12.

Target Rotation="K"

Meanwhile, when it is determined that the rotation "K" of the motor 12 is greater than the specified value "A" in step 111, it is determined that the rotation "K" of the motor 12 exceeds the play of the rotation transmission system of the motor 12. The procedure proceeds to step 113 in which the target rotation up to the changed target range (P-range) is set to a value (K+A) in which the specified value "A" is added to the rotation "K" of the motor 12.

Target Rotation="K"+"A"

Then, the procedure proceeds to step 114 in which the open loop control is performed so that the energization phase of the motor 12 is sequentially changed and the motor 12 is driven to the target rotational position (P-range) by the target rotation.

Then, the procedure proceeds to step 115 in which it is determined whether the change of the shift range has been completed (the motor 12 has rotated to the target rotation position) or not. In a case that the encoder 46 has a malfunction, it is determined whether the motor 12 has rotated to the target rotation position based on the output signals of the rotation sensor 16 or a number of switching of the energization phase of the motor 12. When it is determined that the change of the shift range has not been completed in step 115, the procedure goes back to step 114. Then, when it is determined that the change of the shift range has been completed in step 115, the procedure proceeds to step 116 in which the driver is required to use a parking brake. In such a case, for example, a warning lamp (not shown) arranged on an instrument panel of the driver's seat is turned ON or blinked. Alternatively, an alarm is displayed on an alarm display portion (not shown) of the instrument panel of the driver's seat, and the driver is required to use a parking brake by a warning beep or a vocal sound.

According to the above described first embodiment, during changing the shift range (for example, from P-range to NotP-range), it is determined whether it is in the range-change delay condition (the switching completion time of the shift range is delayed than the normal switching completion time). When it is determined that it is in the range-change delay condition, it is determined whether the target range should be changed to the safer range (for example, P-range). As a result, when it is determined that the target range should be changed to a safer range, the target range is changed to a safer range. In case that the switching completion time of the shift range is delayed than the normal switching completion time, even if a driver determines that the shift range cannot be changed before the switching completion of the shift range and the driver gets off the vehicle, the shift range can be switched to the safer range (P-range) and the safety can be secured.

According to the first embodiment, it is determined whether it is in the range-change delay condition (the switching completion time of the shift range is delayed than the normal switching completion time) based on whether the encoder 46 has a malfunction. In a case that the encoder 46 has a malfunction, since the feedback control cannot be normally performed based on the encoder counting, it is likely that the switching completion time of the shift range is delayed than the normal switching completion time. Therefore, it can be determined whether it is in the range-change delay condition by monitoring the encoder 46.

Furthermore, according to the first embodiment, it is determined whether the target range should be changed into the safer range (for example, P-range) based on a driver's alighting condition. In case that the switching completion time of the shift range is delayed than the normal switching completion time, it is likely that a driver may determine (misunderstand) that the shift range cannot be changed before the switching completion of the shift range and the driver may get off a vehicle. If the driver gets off the vehicle, it is better to change the target range into the safer range so as to secure the safety. Thus, it can be determined whether the target range should be changed into the safer range by monitoring the driver's alighting condition.

Furthermore, according to the first embodiment, in a case that the rotation direction of the motor 12 is changed to a counter direction by changing the target range to the safer range, the target rotation of the motor 12 is established in view of the play (backlash) of the rotation transmission system of the motor 12 and the open loop control is performed to drive the motor 12. Thereby, even if the rotation transmission system of the motor 12 has the play, the motor 12 can be driven to the target rotational position corresponding to the target range, so that the shift range can be surely changed (or returned) to the target range (safer range).

Second Embodiment

Figure 5:
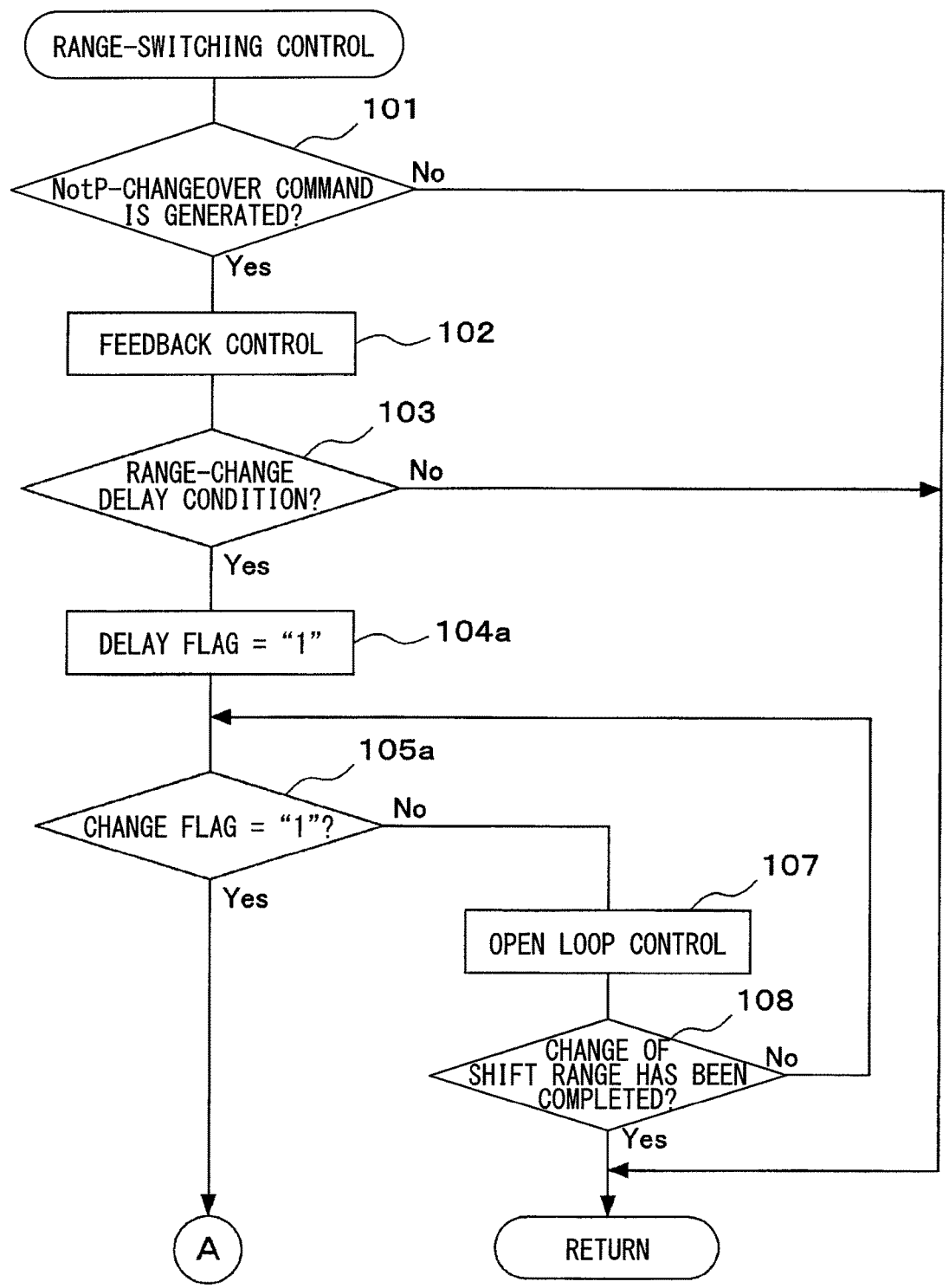
FIG. 5 is a flowchart showing a first half of processing of a range-switching control routine according to the second embodiment.
Figure 6:
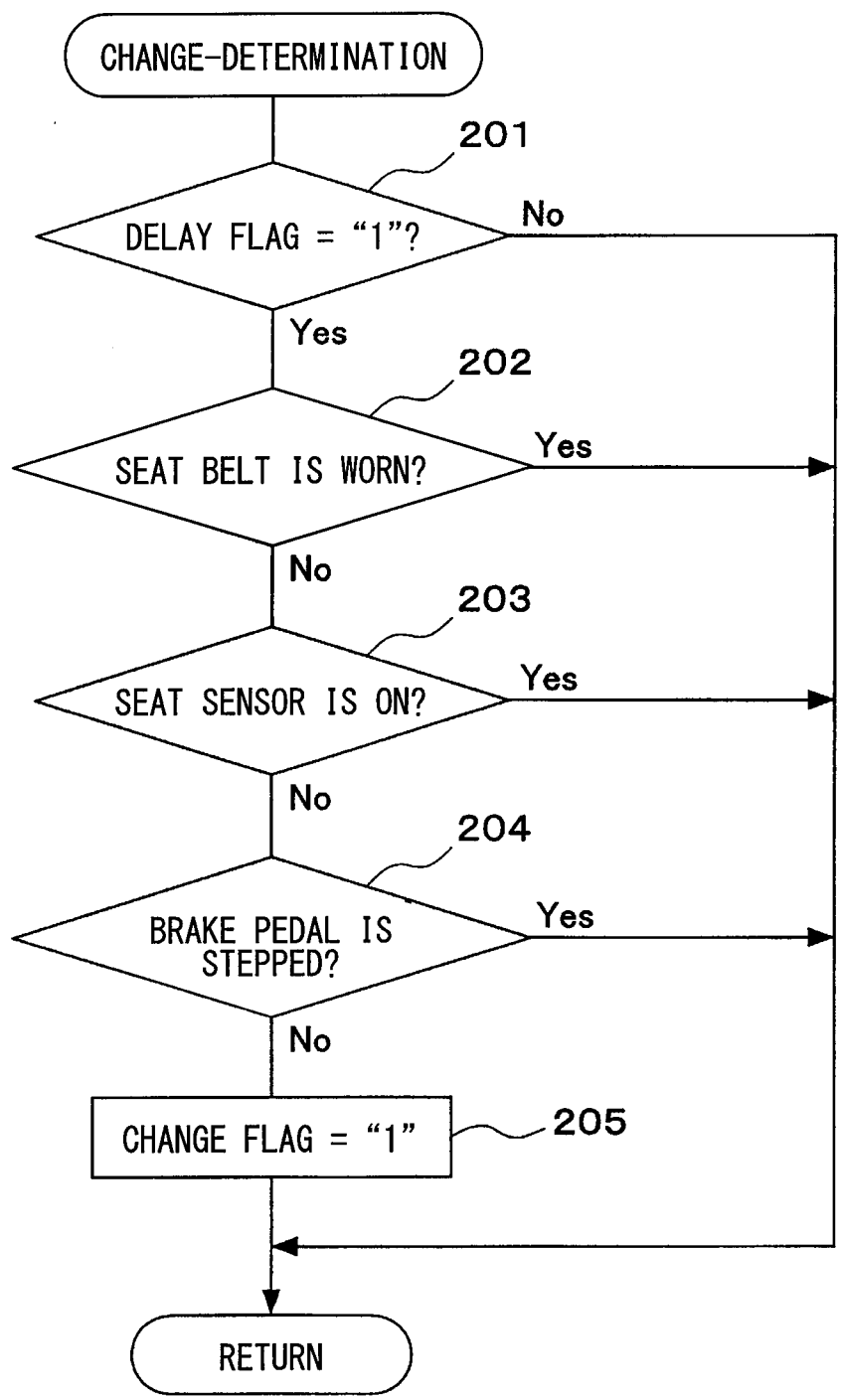
FIG. 6 is a flow chart showing a change-determination routine according to the second embodiment.

Referring to FIGS. 4 to 6, a second embodiment will be described hereinafter. In the second embodiment, the same parts and components as those in the first embodiment are indicated with the same reference numerals and the same descriptions will not be reiterated.

In the second embodiment, the SBW-ECU 42 functions as the delay-determination portion and the target-range-change portion by performing a range-switching control routine shown in FIGS. 5 and 4. The AT-ECU 53 functions as the change-determination portion by performing a change-determination routine shown in FIG. 6.

In the routine shown in FIG. 5, the processes in steps 104 to 106 in FIG. 3 are replaced by processes in steps 104a and 105a. The other steps in FIG. 5 are the same as those in FIG. 3.

The processing of the range-switching control routine shown in FIGS. 4 and 5, which the SBW-ECU 42 performs, and the processing of the change-determination routine shown in FIG. 6, which the AT-ECU 53 performs, will be described hereinafter.

The range-switching control routine shown in FIGS. 5 and 4 is executed at a specified interval while the SBW-ECU 42 is ON. In step 101, it is determined whether the NotP-changeover command is generated. When it is determined that the NotP-changeover command is generated in step 101, the procedure proceeds to step 102 in which a feedback control is performed in such a manner that the energization phase of the motor 12 is sequentially changed according to the encoder counting value and the motor 12 is driven to the target rotational position corresponding to the target range (NotP-range).

Then, the procedure proceeds to step 103 in which it is determined whether it is in the range-change delay condition (the switching completion time of the shift range is delayed than the normal switching completion time) based on whether the encoder 46 has a malfunction. When it is determined that it is not in the range-change delay condition, a delay flag is reset to "0" and the present routine is terminated.

Meanwhile, when it is determined that it is in the range-change delay condition in step 103, the procedure proceeds to step 104a in which the delay flag is reset to "1". In such a case, a change-determination routine, which will be explained later in FIG. 6, is performed to determine whether the target range should be changed to the safer range, and the change flag is reset to "1" or "0".

Then, the procedure proceeds to step 105a in which it is determined whether the change flag is set to "1". When it is determined that the change flag is set to "0" in step 105a, it is determined that the safety can be ensured without changing the target range. In this case, the procedure proceeds to step 107 in which the current range (NotP-range) is maintained without changing the target range and an open loop control is performed so that the energization phase of the motor 12 is sequentially changed and the motor 12 is driven to the target rotational position. After that, the procedure proceeds to step 108 in which it is determined whether the change of the shift range has been completed. When it is determined that the change of the shift range has been completed, the routine is terminated.

Meanwhile, when it is determined that the change flag is set to "1", it is determined that the target range should be changed to the safer range and the procedure proceeds to step 109 in FIG. 4 so that the target range is changed to the safer range (P-range). Then, the procedure proceeds to step 110 in which a driver is notified of changing of the target range to the safer range (P-range).

Then, the procedure proceeds to step 111 in which it is determined whether the rotation "K" of the motor 12 after starting of the shift range change is less than or equal to a specified value "A". When it is determined that the rotation "K" of the motor 12 is less than or equal to the specified value "A" in step 111, the procedure proceeds to step 112 in which the target rotation up to the changed target range (P-range) is set to the same value as the rotation "K" of the motor 12. Meanwhile, when it is determined that the rotation "K" of the motor 12 is larger the specified value "A" in step 111, the procedure proceeds to step 113 in which the target rotation up to the changed target range (P-range) is set to a value (K+A) in which the specified value "A" is added to the rotation "K" of the motor 12.

Then, the procedure proceeds to step 114 in which the open loop control is performed so that the energization phase of the motor 12 is sequentially changed and the motor 12 is driven to the target rotational position (P-range) by the target rotation. Then, the procedure proceeds to step 115 in which it is determined whether the change of the shift range has been completed. When it is determined that the change of the shift range has been completed, the procedure proceeds to step 116 in which the driver is required to use a parking brake.

The change-determination routine shown in FIG. 6 is executed at a specified interval while the AT-ECU 53 is ON. In step 201, it is determined whether a delay flag is set to "1".

When it is determined that the delay flag is set to "0" (not range-change delay condition) in step 201, the routine is finished without performing step 202 and the subsequent steps.

When it is determined that the delay flag is set to "1" (range-change delay condition) in step 201, it is determined whether the target range should be changed into the safer range (for example, P-range) based on a driver's alighting condition in steps 202 to 204.

Specifically, it is determined whether a seat belt of a driver's seat is worn (for example, a seat belt switch is ON or OFF) in step 202.

In step 203, it is determined whether a seat sensor of the driver's seat is ON.

In step 204, it is determined whether a brake pedal is stepped (for example, a brake switch is ON or OFF).

When the answer is "Yes" in any one of the above-mentioned steps 202 to 204, it is determined that the driver does not get off the vehicle (the driver sits on a seat) and the target range should not be changed into the safer range. In such a case, the change flag is reset to "0" to terminate the routine.

Meanwhile, when the answers are "No" in all of the above-mentioned steps 202 to 204, it is determined that the driver has gotten off the vehicle and the target range should be changed into the safer range. The procedure proceeds to step 205 in which the change flag is set to "1" to terminate the routine.

According to the second embodiment, substantially the same advantage can be achieved as the first embodiment.

Besides, in the second embodiment, the SBW-ECU 42 functions as the delay-determination portion and the target-range-change portion by performing the range-switching control routine shown in FIGS. 5 and 4. The AT-ECU 53 functions as the change-determination portion by performing the change-determination routine shown in FIG. 6. With the above configuration, it can be determined whether the target range should be changed to the safer range based on both of the determination results of the SBW-ECU 42 and the AT-ECU 53, so that the reliability can be enhanced. Moreover, the AT-ECU 53 can determine whether the target range should be changed into the safer range based on information which is not input to the SBW-ECU 42, so that it can be determined whether the target range should be changed into the safer range more correctly.

Besides, although the AT-ECU 53 functions as the change-determination portion by performing the change-determination routine shown in FIG. 6 in the second embodiment, another ECU (for example, an engine ECU etc.) may function as the change-determination portion by performing the change-determination routine shown in FIG. 6.

Moreover, in the above first and second embodiments, the present disclosure is applied while the shift range is being changed from P-range to NotP-range. However, the present disclosure may be applied while the shift range is being changed between NotP-ranges (any two ranges of R-range, N-range and D-range). Alternatively, the present disclosure may be applied while the shift range is being changed from NotP-range to P-range.

Furthermore, according to the first and the second embodiment, it is determined whether it is in the range-change delay condition (the switching completion time of the shift range is delayed than the normal switching completion time) based on whether the encoder 46 has a malfunction. However, it may be determined whether it is in the range-change delay condition based on the rotation of the motor 12 after starting the driving the motor 12, an elapsed time after starting the driving the motor 12, the rotation of the motor up to target rotational position, a load torque of the motor 12, etc.

In a case that the rotation of the motor 12 after starting the driving the motor 12 is abnormally small, the elapsed time after starting the driving the motor 12 is abnormally long, the rotation of the motor 12 up to target rotational position is abnormally large, or the load torque of the motor 12 is abnormally large, the motor 12 is not normally driven, so that it is likely that the switching completion time of the shift range is delayed than the normal switching completion time. Therefore, it can be determined whether it is in the range-change delay condition by monitoring the rotation of the motor 12 after starting the driving the motor 12, the elapsed time after starting the driving the motor 12, the rotation of the motor 12 up to target rotational position, or the load torque of the motor 12.

For example, it may be determined whether it is in the range-change delay condition based on whether the rotation of the motor 12 after starting the driving the motor 12 is less than or equal to a specified value at a time when a specified time period has elapsed after starting the driving the motor 12. Alternatively, it may be determined whether it is in the range-change delay condition based on whether the elapsed time after starting the driving the motor 12 exceeds a specified value before the switching completion is completed. Alternatively, it may be determined whether it is in the range-change delay condition based on whether the rotation of the motor 12 up to target rotational position is not less than a specified value at a time when a specified time period has elapsed after starting the driving the motor 12. Alternatively, it may be determined whether it is in the range-change delay condition based on whether the load torque of the motor 12 is not less than a specified value.

Besides, according to the first and the second embodiment, it is determined whether the target range should be changed into the safer range based on a driver's alighting condition. However, the determination whether the target range should be changed into the safer range depends on an operation condition (current position of shift range, or target switching shift range) of the range-switching mechanism 11 or a requirement from a vehicle (a requirement to P-range, a requirement to N-range, etc.). Thus, it may be determined whether the target range should be changed into the safer range based on the operation condition of the range-switching mechanism 11 or the requirement from the vehicle.

Moreover, although the safer range is P-range in the above first and second embodiments, another range (for example, N-range) other than P-range may be defined as the safer range.

Besides, in the above first and second embodiments, the present disclosure is applied to the system provided with the four-position range-switching mechanism which changes a shift range between P-range, R-range, N-range, and D-range. However, the present disclosure may be applied to a system provided with a two-position range-switching mechanism which changes a shift range between P-range and NotP-range. Alternatively, the present disclosure may be applied to a system provided with a three-position range-switching mechanism or a five-position range-switching mechanism. Also in the above systems, the safer range represents a position of the shift range in which the driving force from an engine is not transmitted to driving wheels of a vehicle, and the vehicle is stopped.

Besides, in the above first and second embodiments, when two determinations are "No" in steps 104 to 106 and 202 to 204, it can be determined that a driver got off a vehicle. Alternatively, when at least one determination is "No", it can be determined that a driver got off a vehicle.

In addition, the present disclosure is not limited to an automatic transmission (AT, CVT, DCT, etc.), but may be applied to the system equipped with the range-switching mechanism which switches the shift range of the transmission (reduction gears) for an electric vehicle.

It is understood that the present disclosure is not limited to the above-mentioned embodiment or structure. This disclosure includes various modified examples, and modifications falling within an equivalent range. In addition, various combinations or configurations as well as other combinations or configurations including only one element, or more than or lower than one element therein also fall within a category and a conceptual range of this disclosure.

What is claimed is:

1. A range-switching control device comprising:
   a range-switching mechanism switching a shift range by means of a motor as a driving source;
   an encoder outputting a pulse signal in synchronization with a rotation of the motor;
   a range-switching control portion switching the shift range to a target range by driving the motor to a target rotational position corresponding to the target range, based on a counting value of the pulse signal of the encoder;
   a delay-determination portion determining whether a switching completion time of the shift range will be delayed than a normal switching completion time;
   a change-determination portion determining whether the target range should be changed to a safer range when the delay-determination portion determines that the switching completion time of the shift range will be delayed than the normal switching completion time; and
   a target-range-change portion changing the target range to the safer range when the change-determination portion determines that the target range should be changed to the safer range.

2. A range-switching control device according to claim 1, wherein
   the change-determination portion determines that the switching completion time of the shift range will be delayed than the normal switching completion time based on at least one of an existence or nonexistence of the encoder, a rotation of the motor after starting the driving the motor, an elapsed time after starting the driving the motor, the rotation of the motor up to the target rotational position, and a load torque of the motor.

3. A range-switching control device according to claim 1, wherein
   the change-determination portion determines whether the target range should be changed to the safer range based on at least one of a driver's alighting conditions, an operation condition of the range-switching mechanism and a requirement from a vehicle.

4. A range-switching control device according to claim 1, wherein
   in a case that the rotation direction of the motor is changed to a counter direction by changing the target range to the safer range, the target rotation of the motor is established in view of a play of a rotation transmission system of the motor and an open loop control is performed to drive the motor.

5. A range-switching control device according to claim 1, wherein
   the range-switching control portion functions as the delay-determination portion and the target-range-change portion, and
   the range-switching control portion and another control portion function as the change-determination portion.

6. A range-switching control device according to claim 1, wherein
   the change-determination portion determines whether the target range should be changed to the safer range based on at least one of a determination result whether a seat belt of a driver's seat is worn, a determination result whether a seat sensor of the driver's seat is ON, and a determination result whether a brake pedal is stepped.

* * * * *